Patented Dec. 26, 1939

2,184,317

UNITED STATES PATENT OFFICE 2,184,317

WOOD COKE AND PROCESS OF MAKING SAME

Stevan Ruzicka, Beograd, Yugoslavia

No Drawing. Application July 9, 1934, Serial No. 734,426. Renewed March 26, 1937. In Yugoslavia July 14, 1933

13 Claims. (Cl. 202—26)

My invention relates to wood coke and to the process of making same.

The wood coke obtained by my process is finely porous or spumous but strong, tenacious and hard. The size of its pores is from 2 to 30 microns, its compression strength is not less than 60 kilograms per squ. centimetre, and its friability is less than 5%. The skeleton of the coke is of uniform structure.

Such coke is made, in conformity with the process embodying my invention, from any suitable material which contains, or consists of, wood cellulose, for instance, charcoal. The material is carbonized and pulverized and the pulverized material is mixed with a binder, or the binder is admixed during the pulverization. It must be a residue from a coking operation and may be retort pitch, still tar, or any other tar from the distillation of wood, pit coal, etc., or tar from the process itself, or a mixture of tars. The mixture of pulverized material and binder is briquetted or molded, and is then coked.

The state of the art will first be set out. The principal product obtained by the carbonization of wood is charcoal which, however, if split wood has been carbonized, contains about 50% of dust. That portion which is obtained as solid pieces, possesses such low mechanical strength and is so friable that it is partly reduced to dust during shipping. The dust cannot be used satisfactorily, and, at best, is utilized in boiler furnaces after having been mixed with wood-tar pitch. Specially designed grates are required for such furnaces, and their efficiency is very low.

Small pieces of wood, waste from the exploitation of forests, from saw mills, etc., are for the most part, not used for making charcoal because their percentage of dust is even higher, and because only lump charcoal draws a good price in the market. But even the demand of lump charcoal has decreased very much as the iron-smelting industry which was the principal consumer of charcoal, now prefers pit-coal coke.

From the beginnings of the iron-smelting industry, it had been aware of the good properties of charcoal, its practical freedom from obnoxious constituents, such as sulphur and phosphorus, its great porosity and high calorific value, and had used charcoal for obtaining iron of extraordinary purity which is very valuable for the manufacture of first-class steel. But, notwithstanding the fact that charcoal is endowed with all the good features a reducing agent ought to have, with respect to its chemical as well as to its calorific properties, the iron-smelting industry has practically abandoned charcoal and it is used at present only by some few smaller works. The reason is that as blast furnaces became larger and their charges heavier, the reducing agent had to possess higher mechanical strength than charcoal, as otherwise it would be crushed and broken up by the pressure of the charge. Neither the charcoal from up-to-date wood distilling plants, nor the charcoal from the old-fashioned heaps, possesses such strength and this, together with the comparative cheapness of pit-coal coke, led to the almost complete superseding of charcoal by pit-coal coke, notwithstanding the abovesaid good features of charcoal.

Apart from its lack of mechanical strength, the usual charcoal has some other drawbacks, particularly with respect to its use on a large scale. Firstly, its power of reaction is too high, on account of its porosity and the high percentage of volatile constituents, and therefore the consumption of charcoal per unit of iron is higher than for pit-coal coke. Secondly, the properties of charcoal are not uniform on account of the presence of by-products which can be ascertained from the smell of the major part of charcoal lumps. This is due to the unequal temperature distribution in the heap, and is enhanced by the unequal temperature distribution in the blast furnace.

My novel process eliminates all the abovesaid drawbacks. By it, I obtain from a material such as charcoal which at present is valuless except for its calorific value; a molded or briquetted product which is quite novel and combines the good properties of pit-coal coke and of charcoal. Wood distillation plants are no longer restricted to the carbonization of selected split logs from stems, but may use all sorts of wood waste which are produced at the rate of many millions of tons per year in some countries, and so the operation of such plants becomes more economic. In addition, the principal product, the charcoal itself, is completely utilised, whatever may be the condition in which it is supplied. My novel process places at the disposal of the iron smelting industry the best reducing agent imaginable for blast furnaces, reducing the cost of purest iron for the manufacture of steel, and yields a novel and improved fuel for industrial and domestic pursuits, and for the generation of suction gas.

My invention is based on the knowledge that the skeleton of charcoal per se possesses sufficient mechanical strength after carbonization and that limited usefulness of charcoal as made heretofore, is due to the fact that it was made exclusively with consideration of its calorific value. If certain mechanical properties are required, these must be considered before carbonization.

The teaching of my invention is that the skeleton of the wood coke to be obtained must be formed preliminarily in a definite way, and this forming operation must be followed by coking in such manner that by the preliminary forming the skeleton is obtained, while by the coking the binding of the skeleton and the pore spaces are provided. The invention includes, as one of its principle teachings, the knowledge that the demand for a strong and uniformly reacting wood coke—which is a mechanical requirement—can be fulfilled by mechanical means. The mechanical procedure is uniform grinding of the charcoal, to the destruction of all arbitrary structure of fibres and cavities. My invention further provides varying within wide limits the size of the pores and the form of the grains of the charcoal by using particular types of mills. Thus, ball mills yield grains of more or less globular shape while disintegrators yield grains of principally fibrous character. The size of the grains may obviously also be varied by selecting certain types of mills.

If a binder of known coking properties is admixed to the pulverized charcoal in such manner, for instance, by spraying, that it is distributed very finely and uniformly, the pore-forming blisters are also generated uniformly throughout the skeleton, and are of similar size.

The coke obtained includes approximately the same amount of solid matter in approximately uniform distribution within the skeleton in the most various cross sections. This is one of the most important conditions for sufficient strength.

Physically considered, my novel wood coke is a uniformly finely porous and strong spumous substance.

By "pores" I mean the spaces within the individual particles, and principally the cell cavities of the wood structure, the medullary rays which have become cavities by coking, and the other cavities which are naturally present, or have been formed by coking or carbonization, within the particles. "Intermediate spaces" are the spaces between the points where several particles are in contact with each other. The total cavity of my novel wood coke therefore is built up from the pores and intermediate spaces. The two kinds of cavities together make up the cavity volume which may be measured after the briquette or the like has been finished. "Bridges" are the points where adjacent coke particles are connected. The bridges preferably consist of coked binder and connect the individual particles for forming the total coke briquette or agglomerate.

Any kind of wood may be used for my novel process. The ash percentage of the individual kinds of wood obviously varies, and so do, in consequence of the different morphologic structure of the cell texture, the porosity, the strength, the power of reaction, and the microporosity, of the coke, in conformity with the fibre and the density of structure in the kind of wood from which the coke is obtained. The by-products of carbonization and coking will also be different for various kinds of woods. The shorter the fibres, and the denser the structure, of the wood used, the stronger and the more finely porous will be the wood coke. As to the by-products which, as mentioned, may be used as the binder, conifer tar is more valuable, and binds better, than tar from leaf wood.

The mechanical properties of the wood coke are easily ascertained by simple tests, and suitable initial materials are selected for the various kinds of coke required, as indicated by such tests.

The selection of the initial material is determined by the purpose for which the coke will be used, and other materials than wood may be treated, for instance, vegetables of any kind containing cellulose and lignine, or constituents obtained as by-products in the manufacture of cellulose, the hydrolysis of wood, etc. Lignine is preferably carbonized previously to obtain its by-products, such as methyl alcohol, acetic acid, acetone, and other valuable products, but otherwise the lignine coal is treated like charcoal.

The more finely and uniformly the initial material is ground; the higher the pressure at which the mixture of powder and binder is molded or briquetted; and the higher the temperature at which it is coked: the greater will be the hardness and strength of my novel wood coke. The lower limit of compression strength, and the upper limit of friability, have already been indicated. The attainable compression strength far exceeds the lower limit of 60 kg./qcm. Thus, I have made wood coke whose compression strength exceeds 200 kg./qcm., i. e., exceeds very much the strength of the hardest pit-coal coke which is Westphalian coke. My novel coke also possesses great tenacity, on account of its tensile and bending strength, and this is a very valuable property for blast-furnace operation. Owing to the said properties, the friability is very low and therefore the novel coke is split but not crushed under excessive stress. The test results of the novel coke under the dropping and shaking tests are extremely favorable.

The process according to my invention may be performed as follows:

Charcoal powder which has been sifted or ground, as required, is placed in a mixing machine and mixed with a small quantity of a uniformly distributed coking binder. Such binders may be pitch or tar from the distillation of wood, pit coal, lignite, shale, or petroleum, or a mixture of several binders. The binder, or binders, may also be obtained by the previous treatment, i. e., carbonization, of the material from which the dust is obtained. The binders may be introduced in any desired condition. Mostly, it is desirable to introduce them in finely subdivided condition, for instance, by spraying. The equipment required for spraying is simple and the distribution is very uniform. The binder, or binders, may also be added during the grinding of the charcoal, preferably toward the close of the grinding operation, or during the conveying of the powder toward the briquetting machine, for which purpose a helical conveyor may be provided. In this case, the mixing machine is dispensed with.

The mixture of powder and binder is then moulded, for instance, in a briquetting press, and the briquettes are coked at high temperature and under the usual conditions. The coking may be performed in vertical chambers.

If the process is performed as described, the high coking temperature is attained rapidly, and this may cause the volatile constituents to distil from the briquettes too abruptly, and even to burst the briquettes. The binding is deteriorated, the friability increases and the strength decreases, so that wood coke treated in this manner is liable to break. This is avoided by gradually heating the briquettes to coking temperature. The briquettes may be heated continuously until the highest temperature has been attained, or they may be heated stepwise in a vertical chamber whose upper end is at low temperature and whose lower end is at high temperature, with a temperature-gradient zone between the two ends. The operation of this chamber may also be continuous. The coked briquettes are ejected at the lower end and are preferably quenched in dry condition by inert cold gases, for instance, furnace gases.

The process may be performed continuously as follows: Wood, or a material consisting of wood cellulose, or containing wood cellulose, is carbonized at low temperature, ground to uniform condition, mixed with a binder which may be produced during the carbonization of the material itself, or be of foreign origin, during or after the grinding, the mixture is molded or briquetted, and coked as described, for instance, in vertical chambers or retorts.

By the high coking temperature to which the molded or briquetted mixture is subjected, the volatile constituents are reduced to a minimum so that the ignition temperature of the coke is raised and any risk of self-ignition is eliminated.

The stages of my process will now be described. The fine charcoal powder and the binder which is uniformly distributed therein, are mixed into a homogenous paste and the paste is molded or briquetted at elevated temperature. At the elevated temperature, the binder becomes thin and is drawn into the fine pores of the charcoal particles by adsorption forces. The mixture is now subjected to the, preferably gradually increasing, coking temperature. At this temperature, the binder and the charcoal are decomposed thermically and yield their volatile constituents. Mixtures of various chemical compounds are formed at this stage and the percentage of carbon in the compounds increases with the temperature. Chemically pure carbon, however, will never be obtained, be the temperature ever so high. At best, a mixture of highly molecular carbon compounds, with a very high percentage of carbon, is obtained. However, by the coking a higher degree of carbonization is attained than was practicable heretofore. As the constituents of the coke are uniformly distributed, it is a perfectly homogenous fuel of tenacious and hard consistency with a perfectly uniform reaction capacity.

As the temperature rises, the binder, pitch or tar, which is between the grains of the charcoal, gradually distils, forming pores and leaving bridges between the grains. The bridges are anchored very firmly in the fine pores of the wood coke and, with these skeletons, connect the grains into a strong and porous structure. This explains why the briquettes become the stronger and denser, the less porous, and the less friable, the smaller the grains or particles are, i. e., the finer the charcoal has been ground. Finer structure is preferred for briquettes to be used in foundries, for the manufacture of steel, and for the production of suction gas in portable engines. Coarser structure is preferred for the operation of blast furnaces, for domestic purposes, such as the operation of flat irons, grills, and the like.

When the briquettes are molded to the form of cylinders, and the grains of the coke are of elongated form, they will be arranged in layers with the longitudinal axis of every grain at right angles to the pressure of the press head. The strength of such briquettes is not the same in axial and in radial direction, but the difference is not very great. The strength is uniform in spherical, and substantially uniform in egg-shaped or ellipsoidal briquettes. Briquettes of this type, that is of substantially spherical form are also more easily shipped, and less friable which is favorable for blast-furnace operation.

The volatile constituents which are present in ample quantities in charcoal, perform a function in the binding of the coke and in the formation of the bridges from grain to grain which is similar to the function of the binder itself. They are cracked at the coking temperature and the coke residue which remains, cooperates with the pitch and tar coke in the binder for bracing the skeleton. It follows that, the more volatile constituents which are present in the charcoal, and the higher the percentage of heavy constituents, the less binder will be required. This also explains the well known fact that normal heap charcoal which is prepared at higher temperature, is stronger, harder and more tenacious than charcoal from retorts and ovens.

If it is desired that my novel wood coke should possess a higher degree of combustibility, coking is interrupted at a temperature below the final coking temperature.

In order to obtain wood coke whose pores are still finer, and which therefore is a fuel of still larger area, I interrupt the carbonization of the wood at a temperature which is so low that the valuable constituents, such as acetic acid, methyl alcohol, etc., are just separated. The carbonization is interrupted at about 270 to 300° and the initial material for the coking process which is thus obtained, is known as red hydrogenous charcoal. This kind of charcoal is of extraordinary softness and, in fact, is an easily deformable tenacious material which becomes hard but still remains tenacious, upon coking.

When red hydrogenous charcoal is subjected to the molding or briquetting pressure, its cells are much reduced in volume on account of the softness of the charcoal, and in this manner the number of pores per unit of volume is increased. The coke, obtained upon further treatment, becomes denser but has a still greater reactive area. The "ultraporous" wood coke thus obtained is particularly useful for chemical purposes, as an adsorbent of high efficiency, and as a catalyst.

In order to obtain a perfectly dense and not porous body, red hydrogenous charcoal is ground very finely and to the destruction of its cellular structure. This fine powder is mixed with a binder as described, molded or briquetted, and coked at the highest temperatures employed in the manufacture of artificial graphite. Since the structure of the coke is uniform, the wood coke obtained in this manner, with red hydrogenous charcoal as the initial material, is far superior to normal electrode coal as to homogeneity.

The properties of the new wood coke will now be analyzed. Microphotographs of my novel wood coke, if compared with microphotographs of normal pit-coal coke, distinctly show the extraordinarily high number of well-preserved natural pores within the individual particles, as well as the many spaces between the points of contact of several particles, and the many bridges at the contacting points of the particles. The high power of reaction of my novel wood coke can be concluded from the many pores and spaces which appear in the microphotographs, and is also confirmed by tests. The many bridges and walls between the cells, and their very uniform distribution, indicate the unequalled hardness of my novel coke which has also been confirmed by tests. The cause of the hardness and strength of my novel coke is that the size of the particles is reduced to such an extent that the coke is no longer friable, although, per se, its friability is great. By the process according to my invention a strong and uniformly distributed skeleton of comparatively hard bridges is built up about the particles and to this is due the extraordinary mechanical strength of the coke which has also been ascertained by tests.

The great porosity, high power of reaction and high carbon content of my novel wood coke permit its use in all processes in which the reaction of the iron ores is performed at lower temperature and the blast furnace is operated with cold blast. Air heaters are dispensed with and the use of my novel coke effects important savings in initial and operating cost.

It should be noted particularly that the carbonized cellular structure of the wood is preserved very well in almost all particles. The molding or briquetting pressure does not compress the particles to such an extent that their inner structure is crushed. This is important for the observation of the microscopic pore space. As the cellular cavities are preserved not only in the direction visible in the microphotographic section but in all directions, the original structure of the cells in the wood is still present in the particles of the wood coke. It is known how very strong wood is. Plants produce wood in order to support and to protect their bodies, and the individual particles possess high compression strength as the cellular structure of wood is designed against compression stress.

The preservation of the cellular structure of the wood during the molding and coking to which the material is subjected, is the principal cause of the great strength of wood coke, and a subsidiary cause is the influence of the binder. My novel wood coke is at least equal to pit-coal coke as to strength but it is without sulphur and phosphorus, or practically so, and its ash content is very low. Wood coke briquettes are superior to normal charcoal in that they do not break, are without dust, and not friable, possess greater density, are almost free of volatile constituents (in dependence of the final coking temperature) and are less porous. As its properties may be adapted to any purpose for which it is to be used, my noval wood coke is economic, and its properties are invariable. Wood coke briquettes will hardly soil the hands which is a great advantage with respect to their domestic use. As against charcoal, wood coke has high calorific value combined with small volume. The greater density and lesser friability are important for shipping.

My novel process is particularly suitable for continuous and partly cyclic processes, with reinstitutions and interlockings.

The gas produced during the coking of the mixture may be used for starting the coking furnaces, and by-products such as the tar which distils over, may be used again for briquetting in the cycle of operations. In the same manner wood constituents, such as lignine, as obtained by the hydrolysis of wood, may be used by themselves or mixed with pitch or tar, or charcoal dust may be mixed with pitch and tar. All these processes yield excellent and strong briquettes.

The direct advantages of my novel wood coke are supplemented by the advantages of its use for other processes. The density and uniform constitution of the wood coke briquettes permits continuous weighing and charging for shipping as well as for the use of the briquettes, for instance, in blast furnaces. In the last-mentioned case, less flux is required because the ash content is low, and there is neither sulphur nor phosphorus. The operation cost is low in proportion.

The size of the wood coke briquettes may be varied within wide limits, and may be adapted to the size of the ore grains, and to the desired flow of gas through the passages between the coke lumps.

By using the wood coke according to my invention in blast furnaces of largest size, and corresponding initial cost, the establishing of iron works in countries rich in forests will be much expedited. The novel wood coke will be made on a large scale and at low cost and this will facilitate the use of various kinds of high-class steels. Similar considerations also apply to the manufacture of electro iron and to other smelting processes.

The coking gas from the wood coke has a particularly high content of hydrogen, at the rate of more than 50%, which is easily obtained by the usual washing. The coking gas on account of its purity does not require purifying plants and probably is the cheapest source of hydrogen for hydration and other synthetic purposes.

Wood coke in the form of irregular lumps obviously has the same properties as in the form of briquettes. As, however, my process yields briquettes of any size at low cost, without extra equipment and at low power demand, it will generally be preferred to use briquettes instead of lumps. If the particles are elongated or fibrelike, the mixture is shaken before being molded or briquetted under pressure, so that its elongated particles are aligned, for the major part, assuming positions in which their longitudinal axes extend transversely to the direction of the molding pressure.

It is known to anyone skilled in the art, that low temperature distillation or coking is carried out at about 450° C. to 600° C., producing a softer coke or semi-coke giving an incomplete decomposition and that high temperature coking is carried out at from 850° C. in the older installations, and now around 1000 to 1100° C. or sometimes to 1200° C. providing a hard coke. The nature of the transient gases in these distillations, for example, is entirely different.

It is also clear to anyone skilled in the art to bind charcoal with a binder. The mixing of binder to charcoal depends upon many factors each one of which is taken into consideration, for instance, the character of the binder, its bituminal contents, its derivation, whether from hardwood, which gives a tar of less solid bitumen, or from softwood which gives a tar of more solid bitumen, the size of charcoal particles, the finer the particles the more the binder; the size and form of the cell spaces, the density of the charcoal; the character of the mixing, the time the mix is brought to high temperatures, the size of the chambers of the vertical coking apparatus, or whether horizontal chambers are used; and the lower the temperature of the destructive distillation, the less binder is necessary. These and other considerations, clear to any one skilled in the art, enable the invention, hereinbefore so fully defined, to be carried out.

My novel wood coke possesses perfectly novel properties which may be calculated, in morphological, physical, chemical, and petrographic respect which render it a perfectly and absolutely novel material, i. e., wood coke which is finely and uniformly porous, strong notwithstanding its porous or spumous character, tenacious and hard.

I claim:

1. In the process of making wood coke wherein a wood cellulose is carbonized to produce a charcoal, the resulting charcoal is pulverized without destroying its fibrous structure, mixed with a coking binder, briquetted and then coked at coking temperatures to produce a wood coke; the step which consists in shaking the pulverized carbon in order to produce substantial alignment of its elongated particles prior to said briquetting step.

2. The process of making wood coke, comprising carbonizing wood cellulose, pulverizing the resulting charcoal without destroying its fibrous structure, mixing it with a coking binder, molding the mixture under a high pressure and coking the molded mixture at coking temperatures, thereby producing a wood coke having a crushing strength at least equal to that of pit coal; the charcoal particles being shaken to produce substantial alignment of the elongated particles prior to said molding step.

3. The process of claim 1 wherein the coking temperature employed does not substantially exceed 1100° C.

4. The process of claim 2 wherein the coking temperature does not substantialy exceed 1100° C.

5. The method of making a wood coke from charcoal having volatile constituents, which consists in pulverizing charcoal by uniform grinding to the destruction of all arbitrary structures of fibers and cavities under preservation of the microscopic cell walls corresponding to those of the wood from which the charcoal was made, mixing said pulverized charcoal homogeneously with an organic binder under preservation of said microscopic cell walls, the quantity of the binder being less than that of said charcoal, and subjecting, under preservation of said microscopic cell walls, both said charcoal and binder in the mixture to temperatures above the lowest cracking temperature of the volatile constituents of said charcoal and not substantially exceeding 1100° C., in a coking process, for cracking the volatile and other constituents of said charcoal and of the binder, and for converting their residue including said microscopic cell walls into a skeleton structure of homogeneous high molecular carbon compounds and carbon, having the microscopic cell walls of the wood from which the charcoal was made uniformly distributed therein in various cross-sections, free from the arbitrary structures of fibers and cavities of charcoal.

6. As a new article of manufacture, a wood coke composed of a skeleton of high molecular carbon compounds and carbon, substantially free from sulphur and phosphorus having microscopic cell walls free from the arbitrary structures of fibers and cavities of charcoal, the pores of the skeleton being from 2 to 30 microns, said skeleton resulting from subjecting pulverized charcoal, free from such arbitrary structures and an organic binder of a quantity less than that of said charcoal, to temperatures above the lowest cracking temperature of the volatile constituents of said charcoal and not substantially exceeding 1100° C., in a coking process, the solid matter of said skeleton being in substantially uniform distribution with the spaces within, and with the said microscopic cells and other pores of, said skeleton in various cross-sections, said microscopic cell walls corresponding to those of the wood from which the charcoal was made, said article having a compression strength at least equal to that of pit coal coke and not less than 200 kg. per square centimeter, a friability of less than 5 per cent, spumous and finely porous, and of uniform reaction capacity.

7. The method of making wood coke, which consists in subjecting wood to temperatures between 270° C. to 300° C., then pulverizing the same to the destruction of all arbitrary structures of fibers and cavities under preservation of the cell walls corresponding to those of the wood from which the charcoal was made, mixing such pulverized charcoal with an organic binder, the quantity of the binder being less than the quantity of the said pulverized charcoal, subjecting the same to pressure, subjecting under preservation of the microscopic cell walls, both said charcoal and binder in the mixture to temperatures above the lowest cracking temperatures of the volatile constituents of the said charcoal in a coking process, for cracking the volatile constituents of said charcoal and binder and converting their residues including said microscopic cell walls into a skeleton cellular structure of high carbon compounds and carbon, having the microscopic cell walls of the wood from which the charcoal was made uniformly distributed therein in various cross-sections, free from the arbitrary structures of fibers and cavities of charcoal.

8. The method of making a wood coke from charcoal having volatile constituents, which consists in pulverizing charcoal, mixing said pulverized charcoal homogeneously with an organic binder, the quantity of the binder being less than that of the charcoal, and subjecting both the charcoal and binder in the mixture to the operation of a coking process at temperatures above the lowest cracking temperatures of the volatile constituents of said charcoal and not substantially exceeding 1100° C., for cracking the volatile and other constituents of the charcoal and of the binder, and converting their residues into a skeleton structure of homogeneous high molecular carbon compounds and carbon, having the microscopic cell walls of the wood from which the charcoal was made uniformly distributed therein in various cross-sections.

9. As a new article of manufacture, a wood coke composed of a skeleton of high molecular carbon compounds and carbon, substantially free from sulphur and phosphorous and volatiles, having microscopic cell wall structures, the pores of the skeleton being from 2 to 30 microns, said skeleton resulting from subjecting pulverized charcoal and an organic binder of a quantity less than that of the charcoal to the operation of a coking process at temperatures above the lowest cracking temperatures of the volatile constituents of said charcoal and not substantially exceeding 1100° C., the solid matter of said skeleton being in substantially uniform distribution with the spaces within, and with microscopic cells and other pores of, said skeleton in various cross-sections, said microscopic cell walls corresponding to those of the wood from which the charcoal was made, said article having a compression strength between 60 kg. to 200 kg. per square centimeter, spumous and finely porous, and of uniform reaction capacity.

10. In the making of wood coke from charcoal having volatile constituents, the method which consists in subjecting charcoal to temperatures above the lowest cracking temperature of the volatile constituents of said charcoal during the operation of a coking process for cracking the volatile and other constituents of the charcoal, and converting the charcoal under preservation of the cell walls corresponding to those of the wood from which the charcoal was made into a structure consisting substantially entirely of such cell walls formed of high molecular carbon compounds and carbon.

11. As a new article of manufacture, a wood coke consisting of a structure substantially entirely of cell walls corresponding to those of the wood from which the charcoal was made, formed of high molecular carbon compounds and carbon, resulting from the conversion by cracking of constituents of the charcoal used in the making of said structure in a coking process, above temperatures above the lowest cracking temperature of the volatile constituents of said charcoal.

12. In the making of wood coke from charcoal having volatile constituents, the method which consists in subjecting charcoal to temperatures above the lowest cracking temperature of the volatile constituents or said charcoal during the operation of a coking process for cracking the volatile and other constituents of the charcoal, and converting the charcoal under preservation of the cell walls corresponding to those of the wood from which the charcoal was made into a structure consisting substantially entirely of such cell walls formed of high molecular carbon compounds and carbon, and substantially simultaneously subjecting said structure in said coking operation to the highest temperature employed in the manufacture of artificial graphite.

13. As a new article of manufacture, a wood coke consisting of a structure substantially entirely of cell walls corresponding to those of the wood from which the charcoal was made, formed of high molecular carbon compounds and carbon and graphite, resulting from the conversion by cracking of constituents of the charcoal used in the making of said structure in a coking process, above temperatures above the lowest cracking temperature of the volatile constituents of said charcoal and at the highest temperatures employed in the manufacture of artificial graphite.

STEVAN RUZICKA.